(12) United States Patent
Kteily et al.

(10) Patent No.: US 12,162,104 B2
(45) Date of Patent: Dec. 10, 2024

(54) SYSTEM AND METHOD FOR SERVICING WELDING TORCHES

(71) Applicant: NASARC TECHNOLOGIES INC., Waterloo (CA)

(72) Inventors: Naseem Kteily, Waterloo (CA); Michel Tremblay, Waterloo (CA); Dave Springett, Waterloo (CA)

(73) Assignee: NASARC TECHNOLOGIES INC., Waterloo (CA)

(*) Notice: Subject to any disclaimer, the term of this patent is extended or adjusted under 35 U.S.C. 154(b) by 663 days.

(21) Appl. No.: 17/291,410

(22) PCT Filed: Nov. 5, 2019

(86) PCT No.: PCT/CA2019/051569
§ 371 (c)(1),
(2) Date: May 5, 2021

(87) PCT Pub. No.: WO2020/093148
PCT Pub. Date: May 14, 2020

(65) Prior Publication Data
US 2021/0362263 A1    Nov. 25, 2021

(51) Int. Cl.
*B23K 9/133* (2006.01)
*B23K 9/32* (2006.01)

(52) U.S. Cl.
CPC .............. *B23K 9/133* (2013.01); *B23K 9/328* (2013.01)

(58) Field of Classification Search
CPC .... B23K 9/133; B23K 9/328; B23K 11/3072; Y10T 483/17
(Continued)

(56) References Cited

U.S. PATENT DOCUMENTS 5,734,141 A * 3/1998 Voilmy .............. B23K 11/3072
219/86.25
9,365,333 B2    6/2016 Batzel
(Continued)

FOREIGN PATENT DOCUMENTS

CN    203172919 U    9/2013
CN    203793710 U    8/2014
(Continued)

OTHER PUBLICATIONS

International Search Report & Written Opinion in PCT/CA2019/051569 dated Feb. 12, 2020, 12 pages.
(Continued)

*Primary Examiner* — Dana Ross
*Assistant Examiner* — James F Sims, III
(74) *Attorney, Agent, or Firm* — Tucker Ellis LLP

(57) ABSTRACT

Systems for servicing welding torches are provided, which include a feeder assembly and a nozzle cleaning assembly. The feeder assembly may be configured to feed removable components (e.g., contact tips). For example, the feeder assembly comprises a hopper magazine configured to store contact tips for a welding torch so that one contact tip is on top of another contact tip in their horizontal directions and to release each of the contact tips in the horizontal direction. The nozzle cleaning assembly may comprise a brush for cleaning the inner wall of the contact tip and a universal joint for off-centered rotation of the brush head.

18 Claims, 16 Drawing Sheets

(58) Field of Classification Search
USPC ........................................ 219/137.43; 483/16
See application file for complete search history.

(56) References Cited

U.S. PATENT DOCUMENTS

| | | | |
|---|---|---|---|
| 9,908,204 B2 | 3/2018 | Lee et al. | |
| 10,464,162 B2* | 11/2019 | Choi | ................. B65G 47/1421 |
| 11,883,899 B2* | 1/2024 | Choi | ................. B23K 11/3072 |
| 2008/0107239 A1* | 5/2008 | Sayeh | ..................... B25J 15/04 |
| | | | 483/1 |
| 2011/0266300 A1 | 11/2011 | Schwarzli | |
| 2016/0221112 A1 | 8/2016 | Tedeschi et al. | |
| 2017/0106467 A1* | 4/2017 | Choi | ................. B23K 11/3072 |

FOREIGN PATENT DOCUMENTS

| | | |
|---|---|---|
| CN | 106270981 A | 1/2017 |
| CN | 108861131 A | 11/2018 |
| KR | 101672363 | 11/2016 |
| WO | 2009007773 A1 | 1/2009 |

OTHER PUBLICATIONS

Extended European Search Report for EP 19882327.0 dated Nov. 10, 2022, 9 pages.

* cited by examiner

SYSTEM AND METHOD FOR SERVICING WELDING TORCHES

FIELD OF INVENTION

The present invention generally relates to welding torches, and more particularly to servicing welding torches.

BACKGROUND OF THE INVENTION

Welding torches for gas metal arc welding are widely used to join separate workpieces. A welding torch for use in gas metal arch welding generally includes multiple components, such as a gas nozzle for feeding gas to shield a weld location from contamination and a contact tip for transferring welding current to a welding wire which passes through the center of the contact tip.

The condition of the components of the welding torch will affect stability of the welding torch and reliability of the welding performance. For example, during the welding process, spatter from melted welding wires build up inside the gas nozzle, and the spatter accumulated inside the gas nozzle will decrease the gas flow.

Various machines for servicing the welding torches (e.g., contact tip changers, nozzle cleaner systems) have been developed. However, there exists a growing demand for reducing physical footprint of the machines for servicing the welding torches, simplifying their design and/or improving the servicing performance of the machines.

BRIEF DESCRIPTION OF THE DRAWINGS

These and other features of the invention will become more apparent from the following description in which reference is made to the appended drawings wherein.

Figure 1:
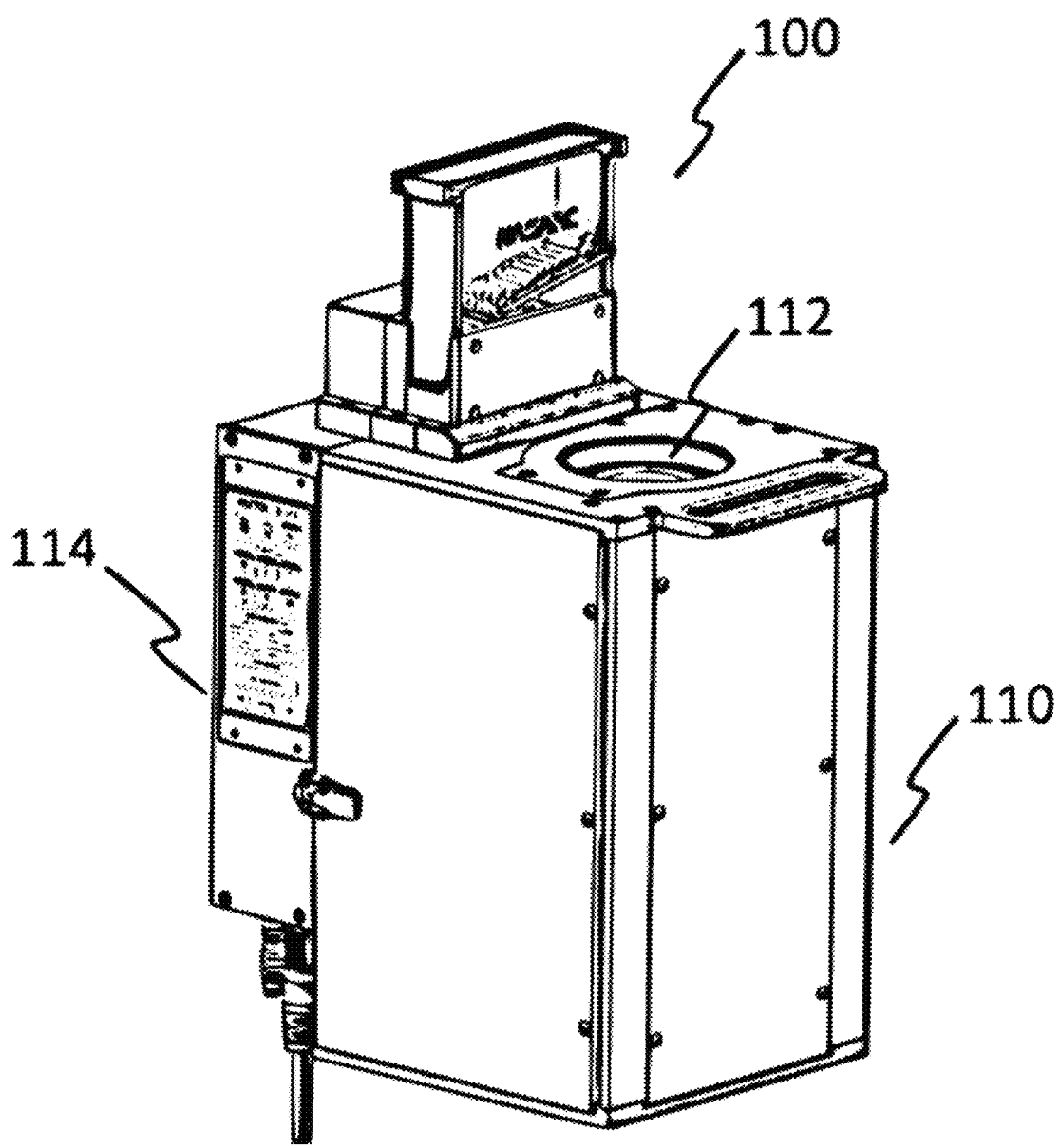
FIG. 1 is a perspective front view of an example of an auto tip changing machine with a tip feeder assembly mounted thereon.
Figure 2:
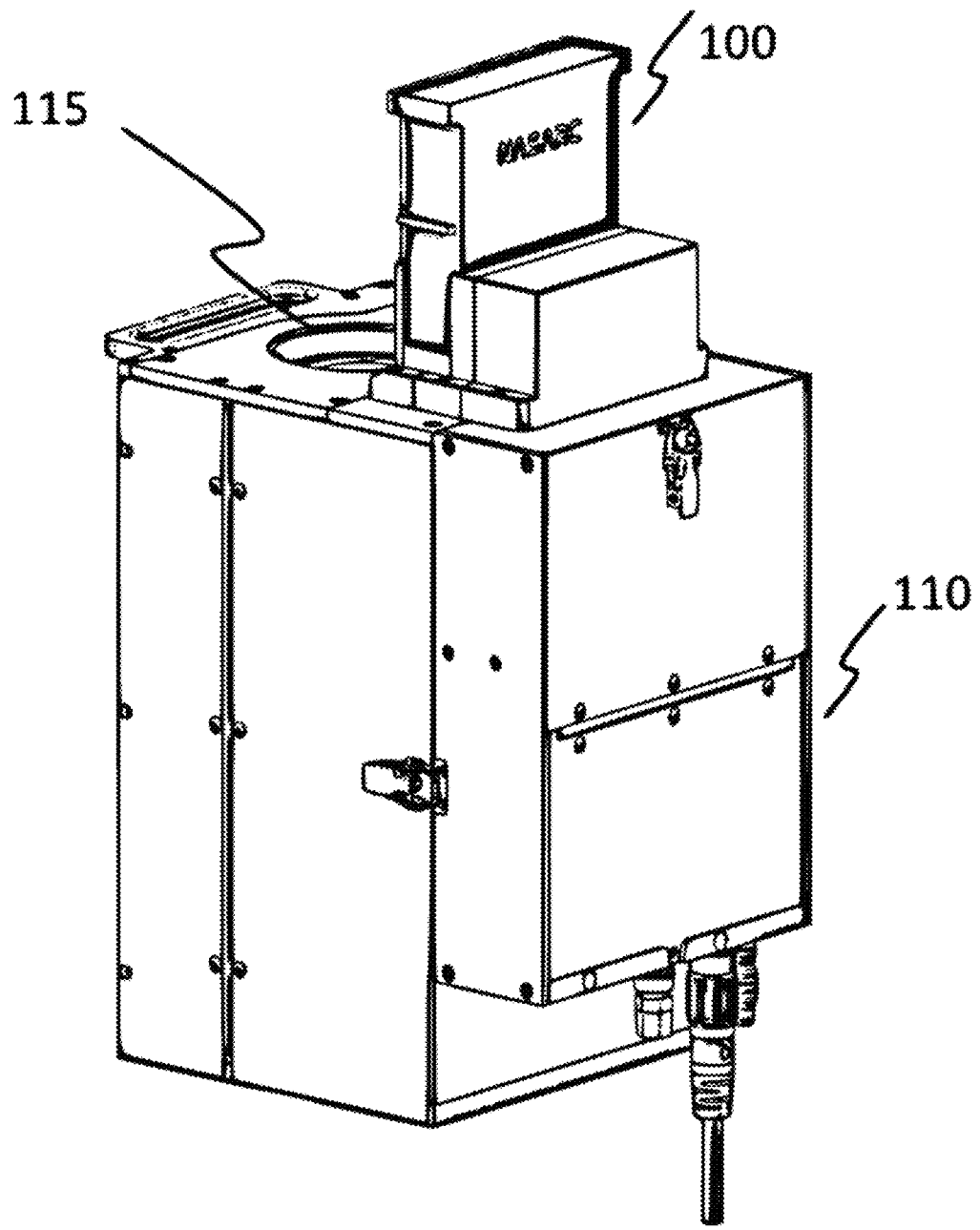
FIG. 2 is a perspective rear view of the auto tip changing machine with the tip feeder assembly shown in FIG. 1.
Figure 3:
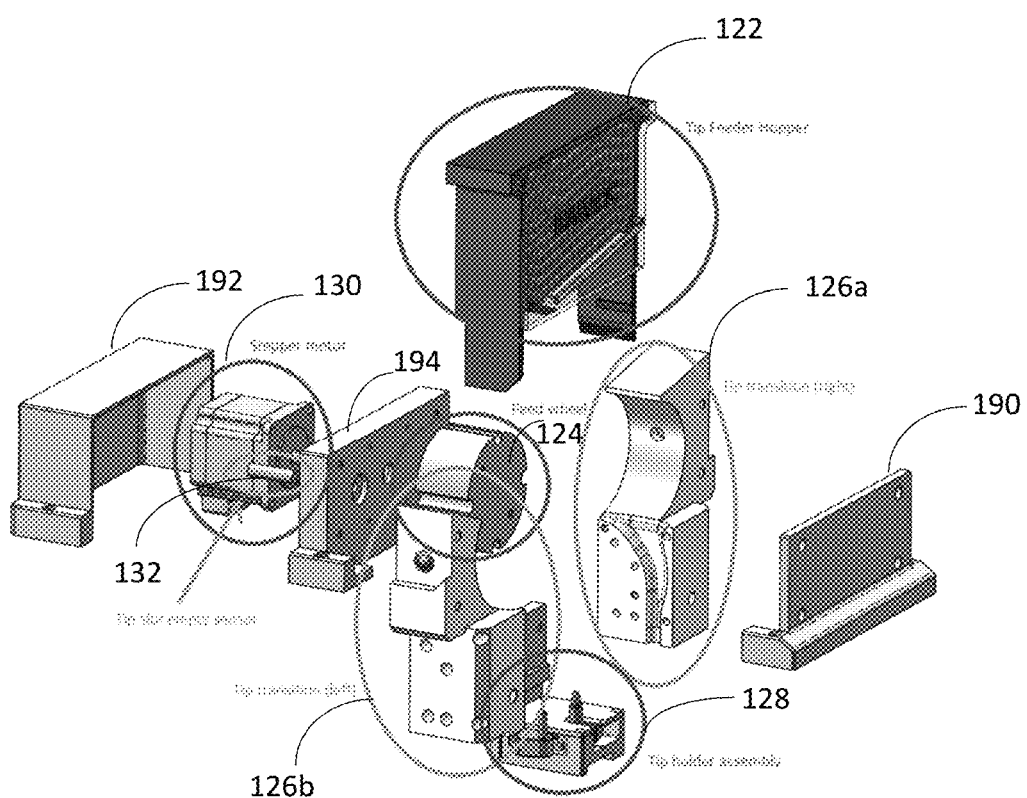
FIG. 3 is an exploded view of the tip feeder assembly of FIG. 1.
Figure 4:
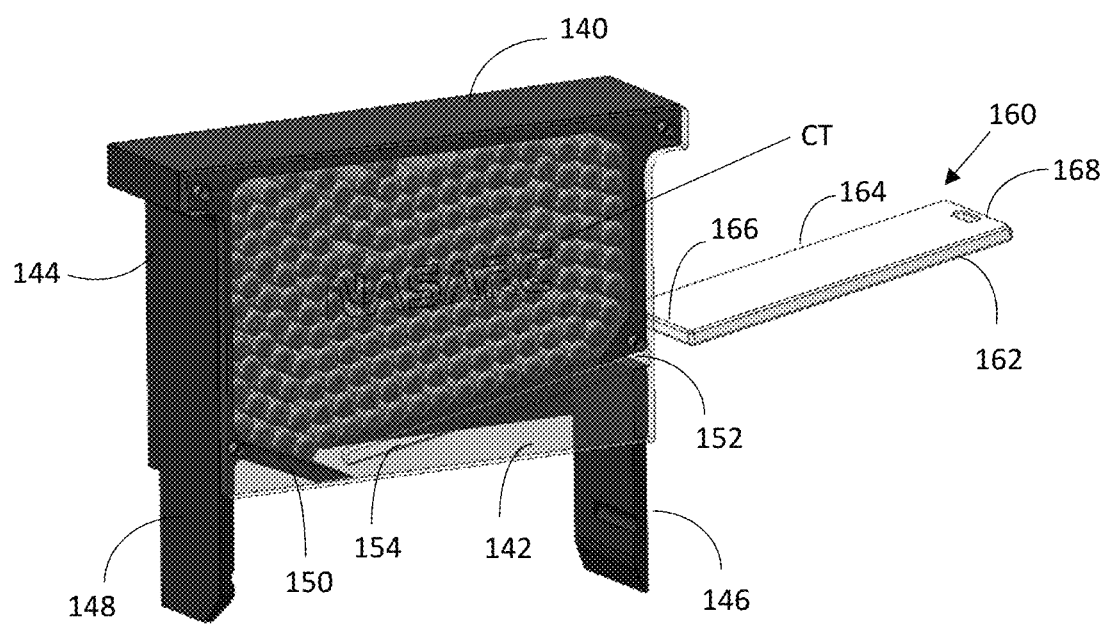
FIG. 4 is a perspective front view of a tip feeder hopper with contact tips and a slide in the tip feeder assembly of FIG. 1.
Figure 5:
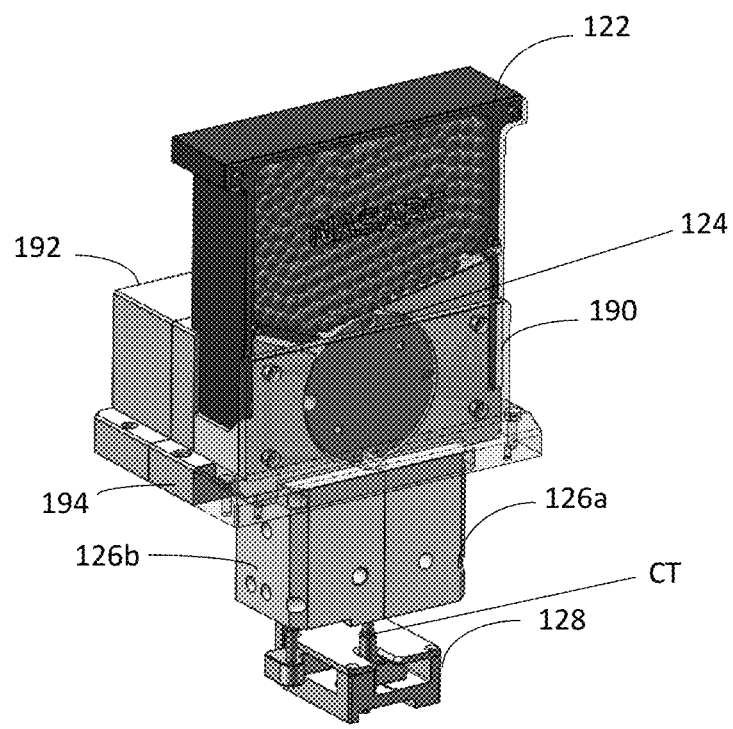
FIG. 5 is a perspective front view of the tip feeder assembly of FIG. 1.
Figure 6:
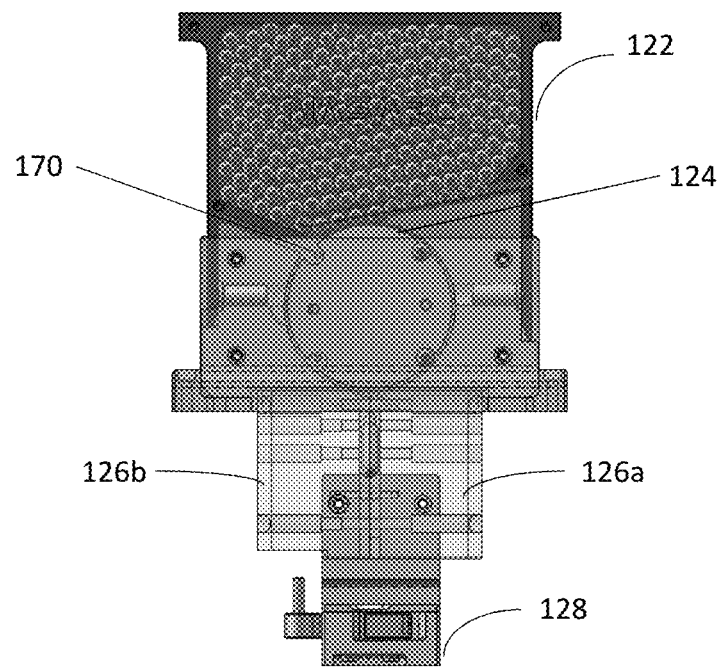
FIG. 6 is a front view of the tip feeder assembly of FIG. 1, showing the feed wheel being rotated and a contact tip being delivered through the tip transition assembly.
Figure 7:
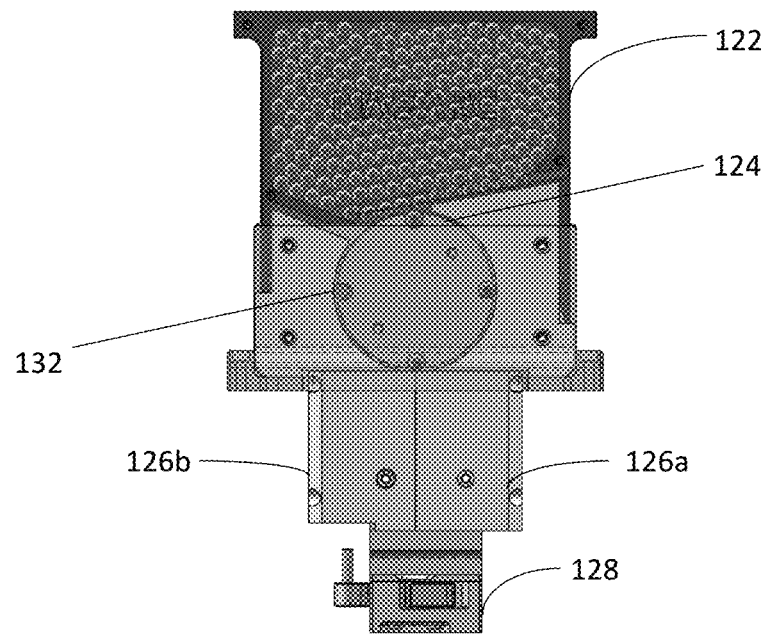
FIG. 7 is another front view of the tip feeder assembly of FIG. 1, showing three contact tips being in the feed wheel, and a tip slot empty sensor detecting a void in the feed wheel.
Figure 8:
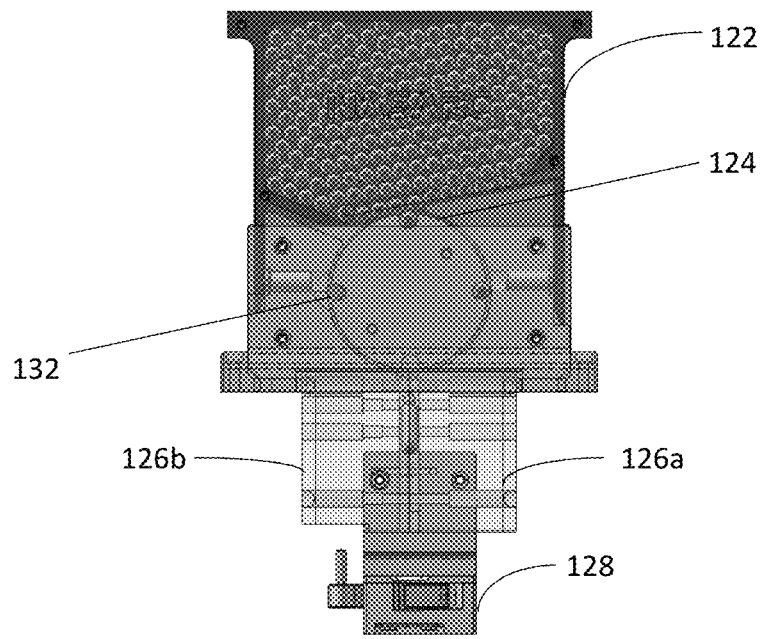
FIG. 8 is a further front view of the tip feeder assembly of FIG. 1, showing the tip slot empty sensor detecting a void in the feed wheel and one contact tip falling through the tip transition assembly.
Figure 9:
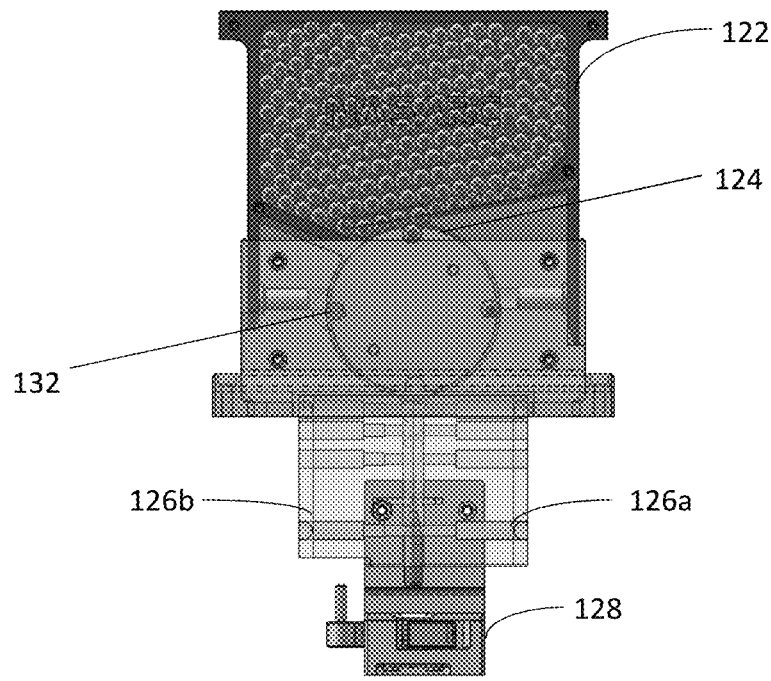
FIG. 9 is a further front view of the tip feeder assembly of FIG. 1, showing the tip slot empty sensor detecting a void in the feed wheel and one contact tip further falling through the tip transition assembly.
Figure 10:
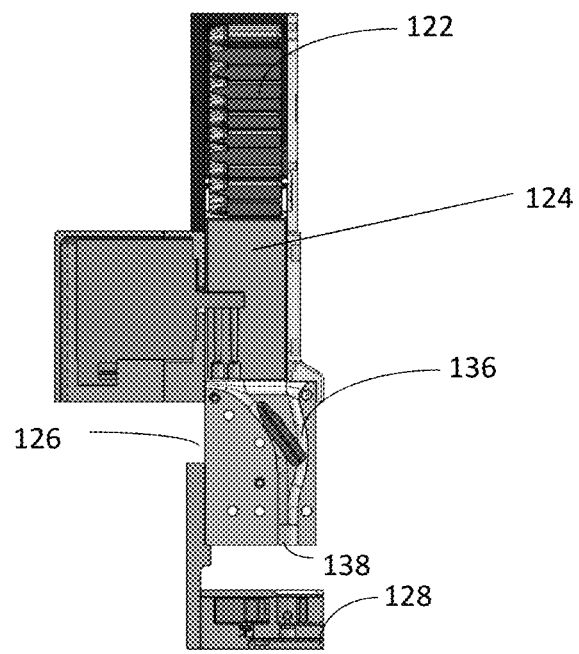
FIG. 10 is a side view of the tip feeder assembly of FIG. 1, showing the contact tip being reoriented though the tip transition assembly.
Figure 11:
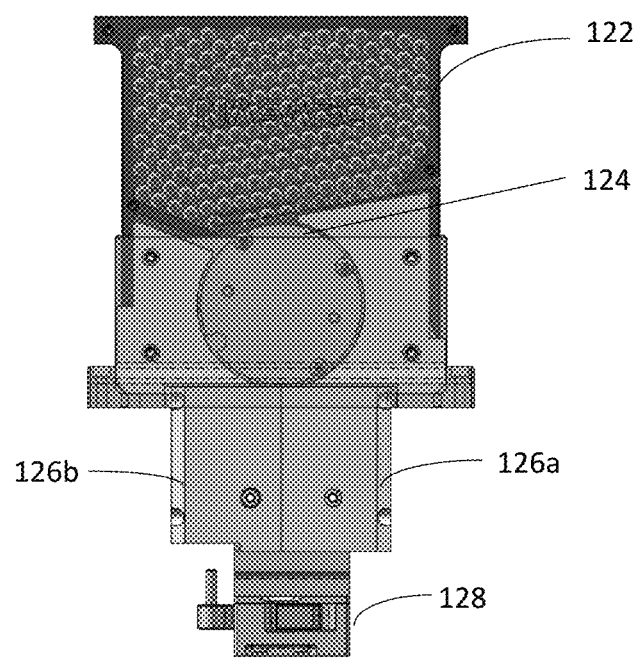
FIG. 11 is a further front view of the tip feeder assembly of FIG. 1, showing a new tip falling from the tip feeder hopper, into a vacant tip slot in the feed wheel and two contact tips being in the feed wheel.
Figure 12:
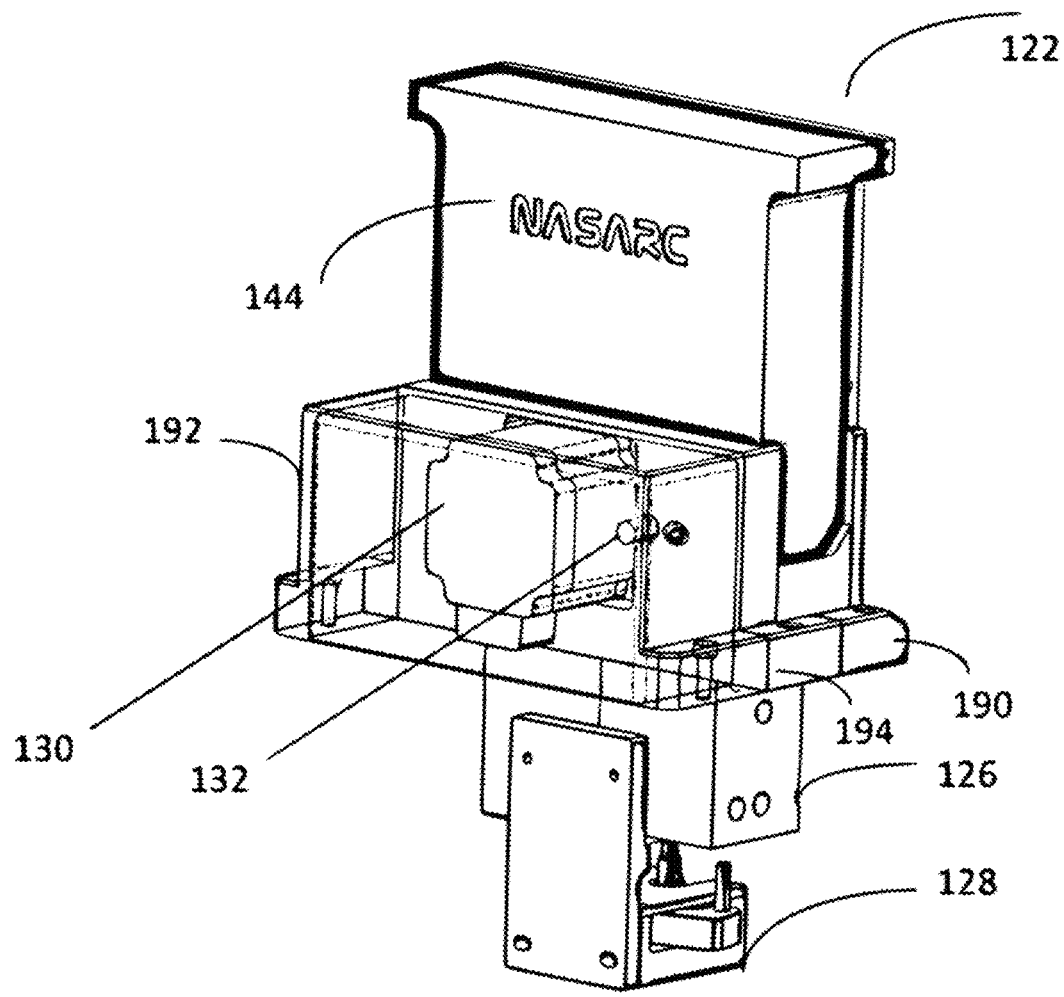
FIG. 12 is a perspective rear view of the tip feeder assembly of FIG. 1, showing a stepper motor and a tip slot empty sensor covered by a support member.

For simplicity and clarity of the illustration, elements in the figures are not necessarily to scale, they are only schematic and are non-limiting, and the same reference numbers in different figures denote the same elements, unless stated otherwise. In the drawings, some portions of elements are illustrated as transparent for illustration purposes only, unless stated otherwise.

DETAILED DESCRIPTION

Various embodiments are generally related to systems and methods thereof for servicing welding torches, which are described in detail below by way of example. The examples and figures are illustrative only and not limit the invention.

In one aspect of the embodiments, there is provided a tip feeder assembly for feeding contact tips for a welding torch. The tip feeder assembly has a hopper magazine system that can stock one contact tip on the other tip horizontally, thereby increasing the tip density. The tip feeder assembly has multiple components that are easily assembled. The tip feeder assembly is detachably attached to a tip changer machine and is replaceable.

In another aspect of the embodiments, there is provided a nozzle cleaning assembly for cleaning the inner wall of a gas nozzle for a welding torch. The nozzle brush assembly provides an off-centered rotation of a brush about the motor's central axis, resulting in effective cleaning of the inner wall of the gas nozzle.

In this disclosure, the terms "machine", "system", "device", "module", "tool", or "apparatus" may be used herein interchangeably. The machine, system, device, module, tool, or apparatus described herein may be a hardware based system or a combination of the hardware based system and a software based computer system which may include multiple (computer) components or installations operably connected to each other, each of which may include one or more programmable processors, one or more memories, and one or more hardware and/or software based user interfaces.

Tip Feeder Assembly

Referring to FIGS. 1-12, one example of a tip feeder assembly 100 for feeding contact tips is described. The tip feeder assembly 100 employs a hopper magazine that can stock a contact tip onto the other tip horizontally, which increases the tip density making it more physically space efficient than conventional carousel-type tip feeders. The hopper magazine has a simplified design, which is manufactured at a lower cost and is easily assembled. The tip feeder assembly 100 with the hopper magazine allows for loading and feeding the contact tips in a simple manner. In the illustrated embodiment, the feeder assembly 100 is deigned to feed contact tips, but in another embodiment, the feeder assembly 100 may be used for nozzles.

When used, the tip feeder assembly 100 may be mounted on top of an auto tip changing machine 110. The machine 110 may include a tip change module (not shown) for removing a contact tip from a welding torch and attaching a new contact tip to the welding torch. A welding torch may be inserted from the opening 112 of the auto tip changer machine 110. The operation of the machine 110 may be controlled by a programmable controller which may include a memory, a processor, a user interface(s) (e.g., 114 of FIG. 1), and a display etc. The operation status of the components of the machine 110 may be visually displayed. The feeder assembly 100 may be arranged on a machine other than the auto tip changing machine 110.

In the illustrated embodiment, the tip feeder assembly 100 comprises a tip feeder hopper 122, a feed wheel 124, a tip transition assembly 126, a tip holder assembly 128, a stepper motor 130, and a tip slot empty sensor 132. The tip feeder hopper 122 is detachably mounted on the tip transition assembly 126. The tip transition assembly 126 is formed by first and second tip transition blocks 126a and 126b. The first and second tip transition blocks 126a and 126b are substantially symmetrical to each other. The tip transition blocks 126a and 126b form a cylindrical section for rotatably accommodating the feed wheel 124. The tip transition blocks 126a and 126b also form a curved chute (or a guide channel) 136 extending from the cylindrical section. The tip holder assembly 128 is placed under the chute 136. The tip feeder hopper 122, the feed wheel 124, and the tip transition assembly 126 are fastened together by support members 190, 192 and 194. The stepper motor 130 and the tip slot empty sensor 132 are positioned with respect to the feed wheel 124 by using the support member 194.

The tip feeder hopper 122 is configured to stack new or replacement welding contact tips (see e.g., "CT" in FIG. 4) substantially in their horizontal orientations. Since one contact tip is directly stacked on top of the other tip horizontally, this configuration allows for a greater tip density in the volume of tips, comparing with the conventional circular carousel magazines that store contact tips vertically. In one example, the tip feeder hopper 122 may be configured to hold about 100 to 200 (e.g., 185) or more than 200 contact tips. The number of the contact tips stored in the tip feeder hopper 122 are not limited to these examples. The tip feeder hopper 122 is detachably mounted on the tip transition assembly 126 and thus is replaceable. Resupplying contact tips to the machine 110 is thus simplified by pulling out the tip feeder hopper 122 and replacing it with another tip feeder hopper.

The tip feeder hopper 122 has a body section formed by a top member 140, a front member 142, a rear member 144, a pair of lateral side members 146 and 148, and a bottom member 150. These members of the body section may be integrated or assembled. The side members 146 and 48 extend from the top member 140. The bottom member 150 is arranged at an angle with respect to the side member 148. There is an opening between the bottom member 150 and the first side member 146. The width of each of the top member 140, the side members 146 and 148, and the bottom member 150 is determined based on the length of the contact tip. A slot (or an opening) 152 is formed in the side member 146 of the tip feeder hopper 122, and a groove 154 is formed at an angle in the front member 142 of the tip feeder hopper 122. The groove 154 is coupled to the slot 152. The front member 142 is a transparent panel so that a user can easily check whether the tip feeder hopper 122 is empty.

The tip feeder hopper 122 is provided with a removable slide 160. In the illustrated embodiment, the slide 160 has a substantially rectangular shaped body which has a first side member 162, a second side member 164, a third side member 166, and a forth side member 168. The slide 160 can be manually inserted into and pull out from the tip feeder hopper 122. The slide 160 is inserted from the slot 152 into the tip feeder hopper 122 to close the opening of the body section of the tip feeder hopper 122. The slide 160 is received along the groove 154 of the tip feeder hopper 122 so that it is engaged with the tip feeder hopper 122. Similarly, a groove similar to the groove 154 may be formed in the rear member 144 of the tip feeder hopper 122 so that the second side member 164 of the slide 160 is engaged with the rear member 144. When inserted, the slide 160 may be engaged or in touch with the bottom member 150 of the tip feeder hopper 122.

With the slide 160 in a closed position (i.e., the slide 160 being inserted into the tip feeder hopper 122), the tip feeder hopper 122 with the slide 160 provides a closed body for holding contact tips inside the body. With the slide 160 in an open position (i.e., the slide 160 being not inserted into the tip feeder hopper 122), the opening of the body section of the tip feeder hopper 122 allows the contact tips in the tip feeder hopper 122 to fall into position above the feed wheel 124 (see e.g., FIG. 5).

For example, during shipping or moving of the tip feeder hopper 122, the slide 160 is used to keep the contact tips held firmly in place within the tip feeder hopper 122. After the tip feeder hopper 122 has been placed into the proper position on the machine 110, the slide 160 is removed outwardly from the tip feeder hopper 122, and the contact tips in the tip feeder hopper 122 are available to the machine 110 for use. After using each of the contact tips in the tip feeder hopper 122, the tip feeder hopper 122 may be dismounted and replaced with another the tip feeder hopper having contact tips. New contact tips may be loaded into the used tip feeder hopper 122 by using the opening in the body section of the tip feeder hopper 122.

When assembled, the tip transition assembly 126 is located between the side members 146 and 148, below the bottom member 150 and the groove 154. The bottom member 150 of the tip feeder hopper 122 and the top of the tip transition assembly 126 are angled to encourage the tip movement from the tip feeder hopper 122 into the feed wheel 124. In the illustrated embodiment, the contact tips on the angled surfaces of the tip feeder hopper 122 and/or the tip transition assembly 126 move towards the center where the feed wheel 124 is positioned.

When assembled, the feed wheel 124 mounted on the transition assembly 126 receives a contact tip released from the tip feeder hopper 122 and drops it to the tip transition assembly 126 while rotating. The feed wheel 124 has a rotatable ring shaped member that is coupled to the stepper motor 130. The rotation direction and speed of the feed wheel 124 is directly controlled by the stepper motor 130. The stepper motor 130 may be actuated in either the clockwise or counterclockwise direction. In one example, the clockwise movement may be used to move the contact tips to the tip transition assembly 126 while the counterclockwise movement may be used to vibrate the contact tips in the tip feeder hopper 122 to prevent the contact tips from becoming lodged in position. The clockwise and counterclockwise movements may be programmed, and automatically or manually selected.

Tip slots (or grooves) 170 are formed on the outer circumferential surface of the ring shaped member of the feed wheel 124. The tip slots 170 allow for contact tips to lie in the slots and to be carried by the feed wheel 124 through its rotation. For example, while the feed wheel 124 is rotating, a new tip will fall from the tip feeder hopper 122, into a vacant tip slot when the tip slot is exposed to the contact tips (see e.g., FIG. 11). During the rotation, the contact tips lying in the feed wheel 124 are bounded by the tip transition blocks 126a and 126b. The tip transition blocks 126a and 126b force the contact tip to stay in the tip slot 170 while the feed wheel 124 is rotating.

In the illustrated embodiment, four tip slots 170 are formed at 90 degree angles around the circumference of the ring member of the feed wheel 124. Once the contact tip in the feed wheel 124 is rotated through 180 degrees clockwise, from the top position (origin), it locates at the bottom-most position of the feed wheel 124. At this point, the tip transition blocks 126a and 126b form the chute 136 for guiding the contact tip down toward an exit 138 of the tip transition assembly 126. The chute 136 allows gravity to pull down the contact tip from the feed wheel 124 into the tip holder assembly 128 (see e.g., FIGS. 6-9). The chute 136 is configured to reorient the contact tip released from its horizontal lying orientation in the feed wheel 124 to the vertical orientation (see FIG. 10). In the illustrated embodiment, the chute 136 is curved downwardly and becomes gradually narrower from its top part towards its bottom part to reorient the contact tip.

The tip slot empty sensor 132 in combination with the stepper motor 130 achieves the optimal positioning of the feed wheel. The combination of the tip slot empty sensor 132 and the stepper motor 130 also provide a sufficient level of accuracy to determine if the feed wheel 124 has been actuated through the desired degrees (e.g., 90 degrees).

The stepper motor 130 is directly coupled to the feed wheel 124 via an output shaft such that any rotation of the stepper motor 130 forces rotation of the feed wheel 124 about its center axis. In one example, the stepper motor 130 is a motor with a programmable controller which may include a memory, a processor, one or more user interfaces, and input and output devices. The status of the stepper motor 130 may be visually displayed. The controller of the stepper motor 130 may be integrated in the controller of the machine 110. The stepper motor 130 is driven with a series of pulse-width modulated signals, where the frequency of the pulse-train determines the speed of rotation. Each period of the modulated signal causes a programmed certain degree rotation (e.g., a 1.8 degree rotation) of the output shaft and the feed wheel 124. This information is used to determine the expected number of pulses to rotate through 90 degree increments.

The output of the tip slot empty sensor 132 provides additional feedback. The tip empty sensor 132 detects whether one of the tip slots in the feed wheel 124 is vacant (or empty) (see FIGS. 7-9). In one example, the tip slot empty sensor 132 may be an inductive proximity sensor. When the tip slot empty sensor 132 detects the feed wheel 124, the tip slot empty sensor 132 output is turned on. When an empty tip slot passes in front of the tip slot empty sensor 132, a void in the feed wheel 124 is detected, and the tip slot empty sensor 132 output is turned off. The output ("on"/ "off") and/or status of the tip slot empty sensor 132 may be visually displayed. The tip slot empty sensor 132 may be coupled to a controller to operate the tip slot empty sensor 132. The controller of the tip slot empty sensor 132 may be integrated in the controller of the machine 110. The stepper motor 130 controller and the tip slot empty sensor 132 controller may be located in a printed circuit board (PCB) (not shown) and a display may be coupled to the PCB.

The tip holder assembly 128 is located below the exit 138 of the tip transition assembly 126. The tip holder assembly 128 holds and transports the contact tip in its vertical orientation to a tip changer module in the machine 110 for attaching the new contact tip to a welding torch.

Nozzle Cleaning System

Referring to FIGS. 13-17, one example of a universal-joint (U-joint) nozzle cleaning (brush) assembly 200 for cleaning a gas nozzle is described. The U-joint nozzle brush assembly 200 is configured to clean the inner wall of the gas nozzle that has been removed from a welding torch. The U-joint nozzle brush assembly 200 provide a unique movement of a brush head, which allows for efficient cleaning of the inner wall of the gas nozzle.

When used, the U-joint nozzle brush assembly 200 may be mounted in an auto cleaning machine 250. The machine 250 may include a module(s) for receiving the welding torch, removing the gas nozzle from the welding torch, and holding the gas nozzle for cleaning. The operation of the machine 250 may be controlled by a programmable controller which may include a memory, a processor, a user interface(s) (e.g., 252 of FIG. 17), and a display etc. The operation status of the components of the machine 250 may be visually displayed. The nozzle brush assembly 200 may be arranged on a machine other than the auto cleaning machine 250.

In the illustrated embodiments, the U-joint nozzle brush assembly 200 comprises a replaceable brush (or brush head) 202, a motor 204, a U-joint 206, and an extension spring 208. The motor 204 is a rotary pneumatic motor having a plurality of internal vanes (not shown) formed along a shaft (a central axis) of the motor 204. The motor 204 rotates about the central axis by applying air pressure to the vanes internal to the motor 204. The rotation of the motor 204 may be pre-programmed and/or manually changed.

When assembled, the brush 202 is mounted on the universal joint 206 connecting to the motor 204 output shaft, and the U-joint 206 is located within the inner space of the extension spring 208. The extension spring 208 adjusts the range of movement of the U-joint 206 and keeps initial alignment.

Figure 16:
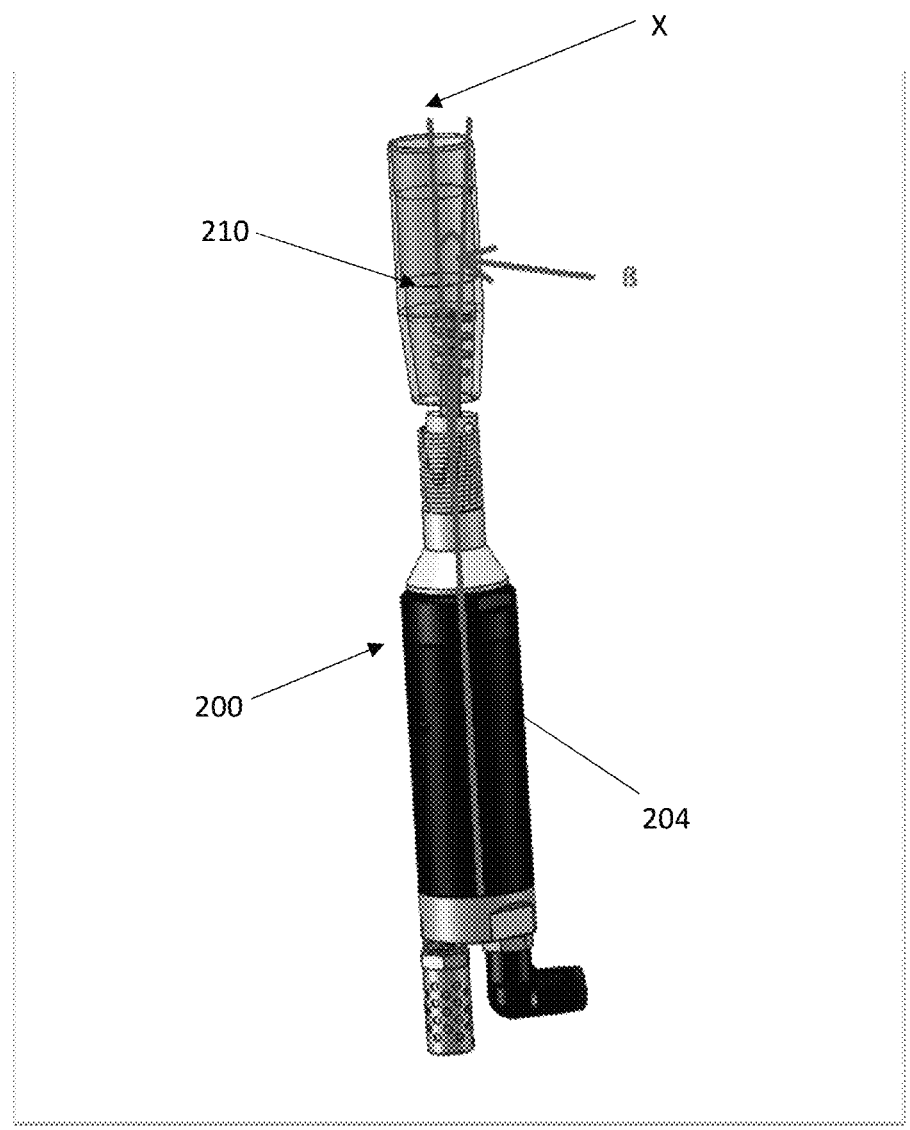
FIG. 16 is a further front view of the universal-joint brush assembly of FIG. 14, showing off-center rotation of the brush.
Figure 17:
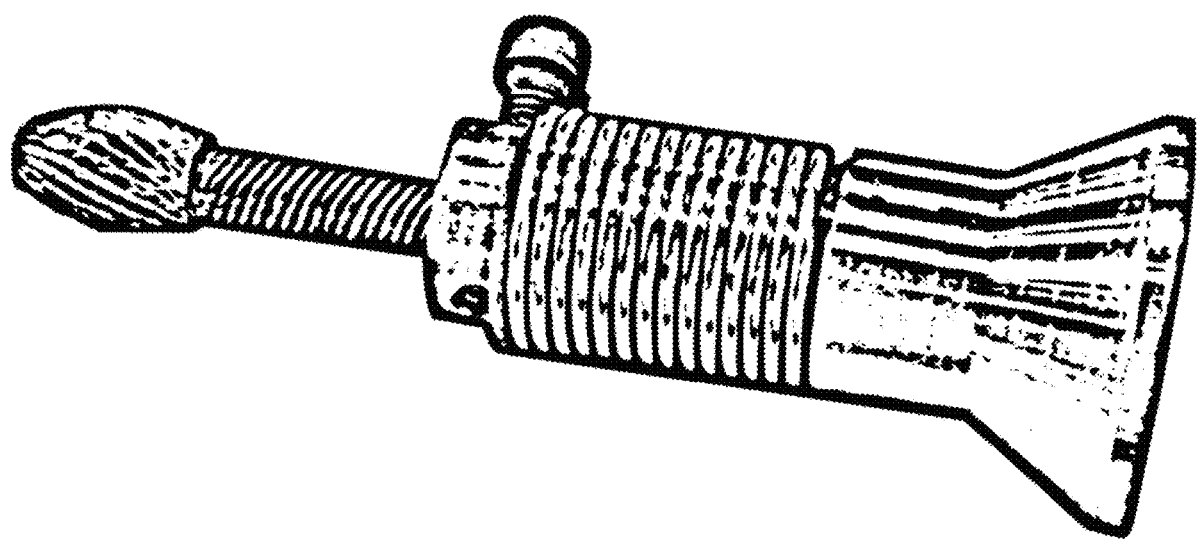
FIG. 17 is another example of the tip feeder assembly having a brush with a universal-joint.
Figure 18:
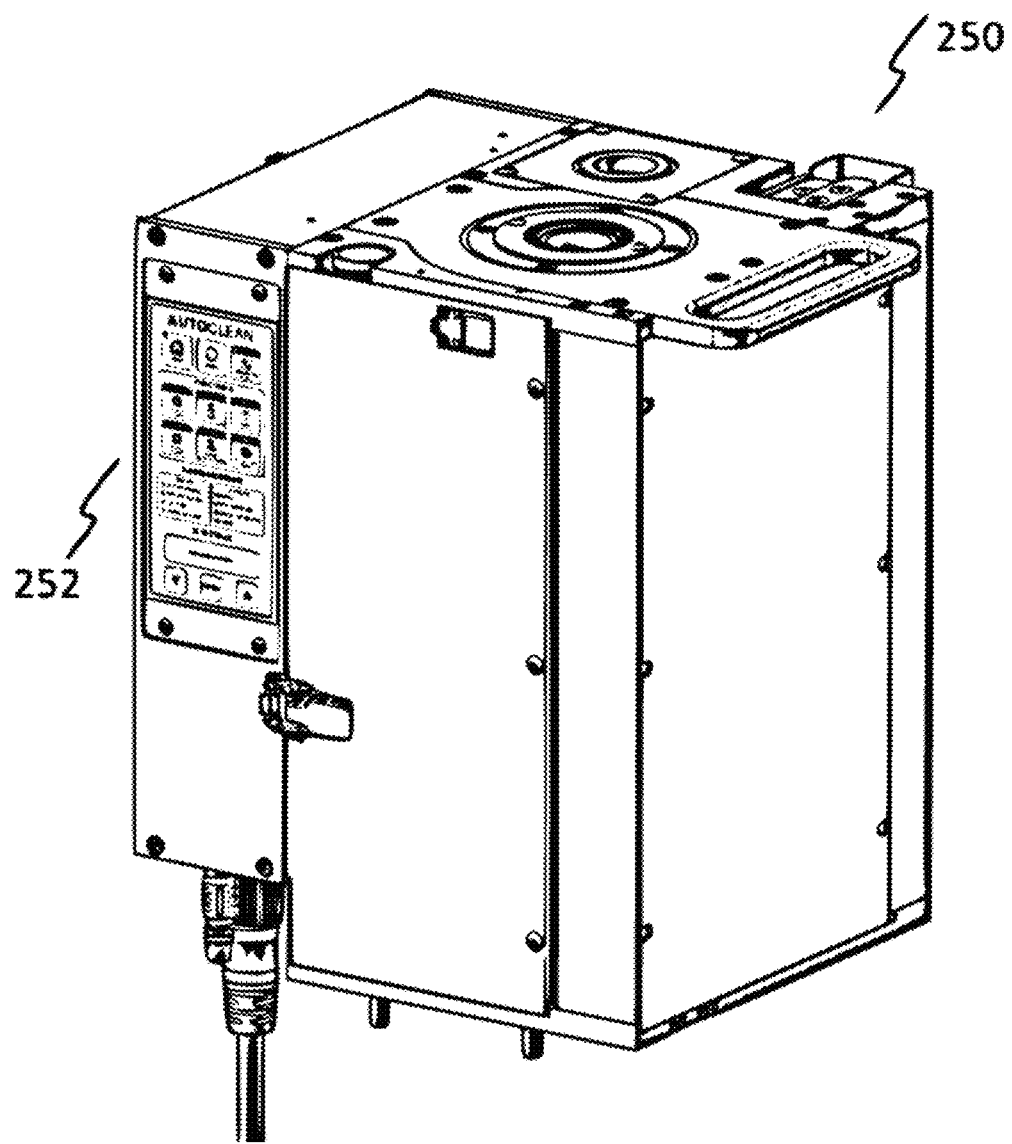
FIG. 18 and FIG. 19 are perspective views of an auto cleaning machine on which the universal joint brush assembly may be mounted.
Figure 19:
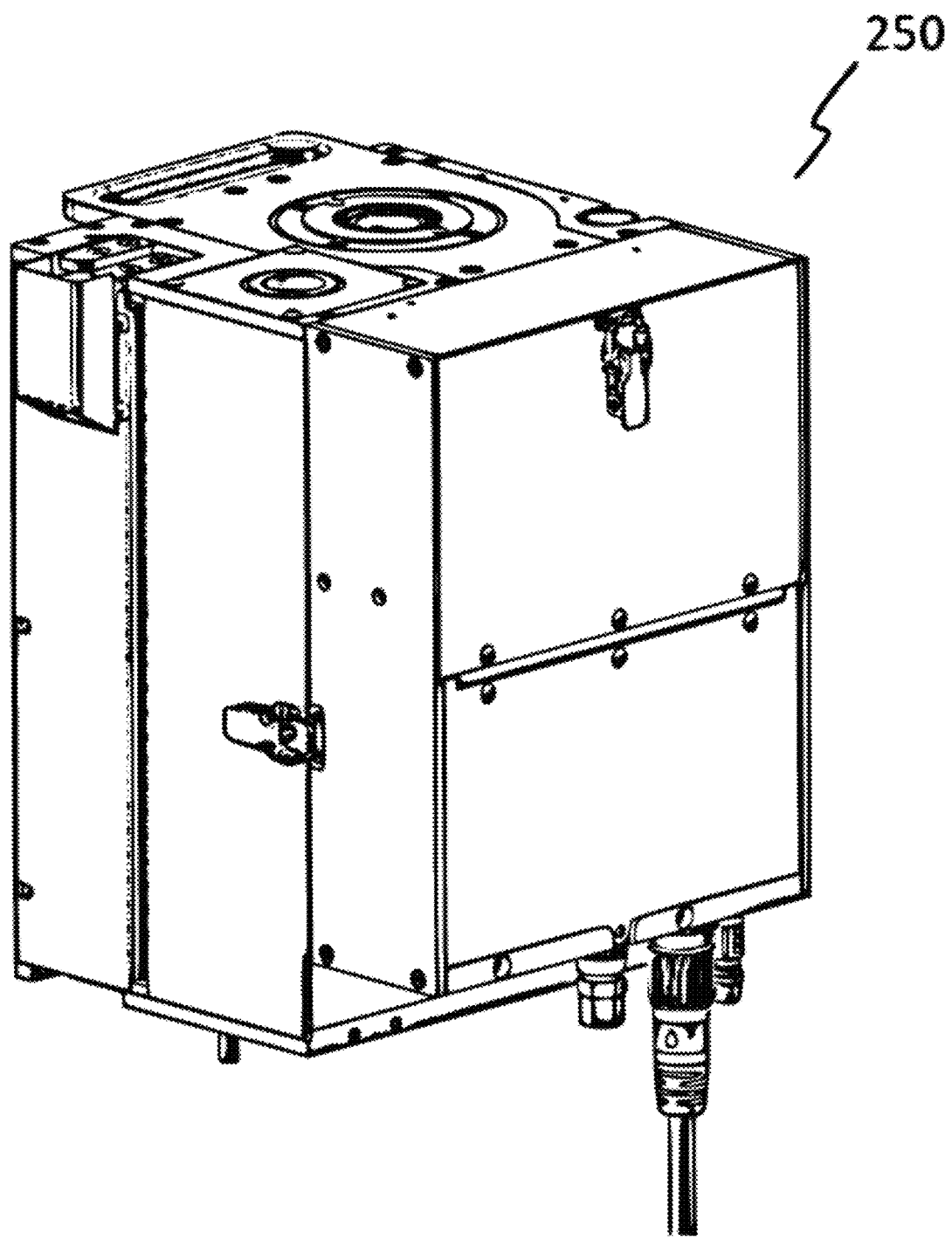

When a welding torch with a gas nozzle 210 is brought to the nozzle cleaning station, the welding torch is cramped and the gas nozzle 210 is removed from the welding torch, and the gas nozzle 210 is brought towards the U-joint nozzle brush assembly 200 (see FIG. 16). While the nozzle 210 is moved downwards, the motor 204 is stationary, and because it is stationary, the extension spring 208 on the exterior of the universal joint 206 maintains the vertical axis common to the motor 204 and the brush 202. Once the nozzle 210 reaches the bottom-most position inside the nozzle cleaning station, the motor 204 is forced to rotate by applying air pressure to the veins internal to the motor 2014. Since the brush 202 has a center of gravity that lies outside of the axis between the motor 204 and the brush 202, it presents itself as an unbalanced load to the motor 204. Since the load is unbalanced, the brush 202 no longer spins straight along the same axis as the motor 204 shaft but centrifugal force pushes the brush 202 away from the central axis, with the universal joint 206 allowing the brush 202 a degree of freedom to rotate at an angle, β, off center (See FIG. 16).

This off-centered rotation of the brush 202 about the motor's central axis ("X") allows the brush 202 to much more effectively reach the inside walls of the gas nozzle 210 to remove a greater proportion of the spatter accumulated on the walls. Since the brush 202 can now rotate off-center, the brush 202 no longer needs oversized bristles to reach the inside walls of the gas nozzle, but an undersized brush will more easily reach the walls providing longer bristle life for the brush, and increased spatter removal inside the nozzle.

Figure 13:
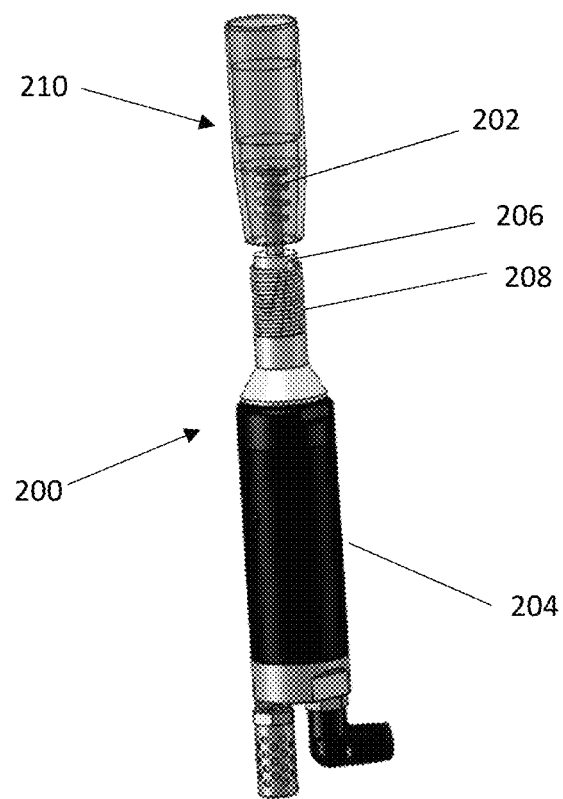
FIG. 13 is a front view of a universal-joint brush assembly and a gas nozzle.
Figure 14:
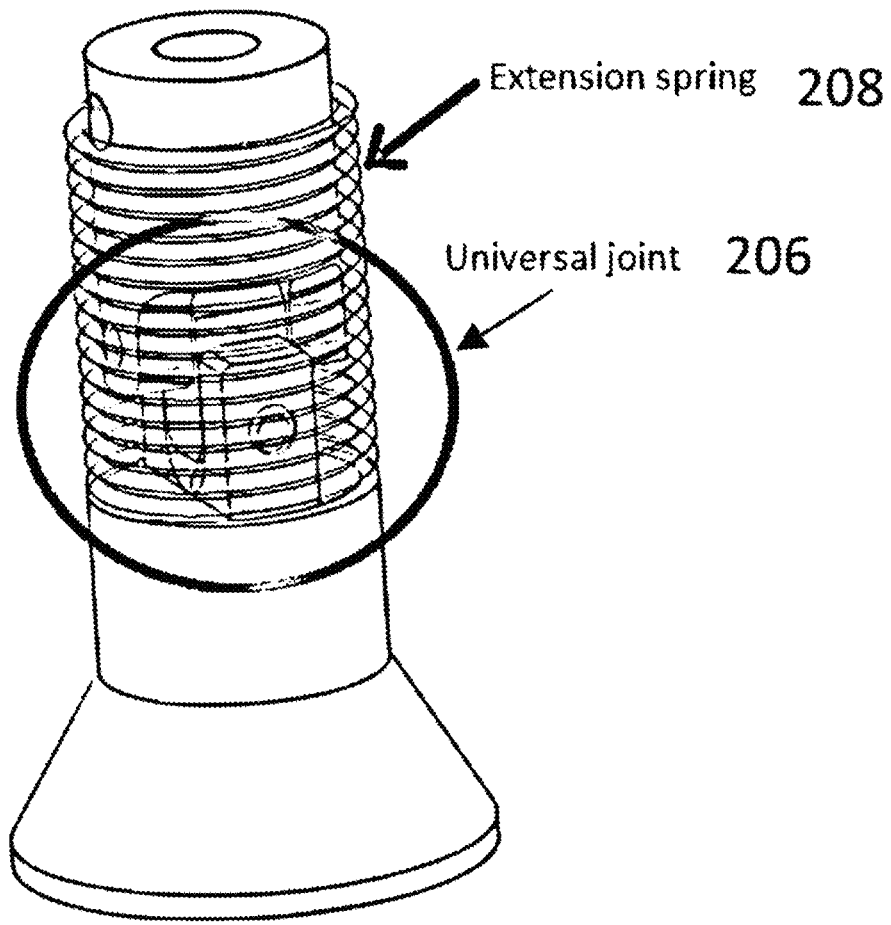
FIG. 14 is a front view of a universal-joint and an extension spring in the universal-joint brush assembly of FIG. 13.
Figure 15:
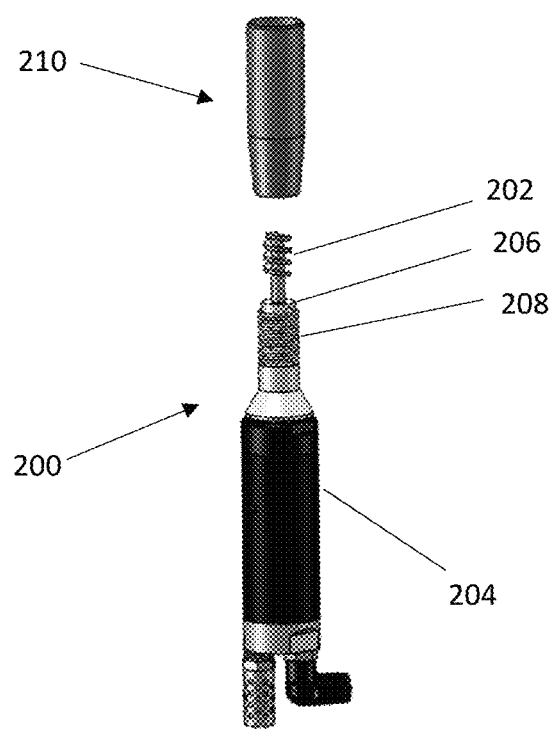
FIG. 15 is another front view of the universal joint brush assembly and the nozzle shown in FIG. 13.

The shape and/or sizes of the brush 202 are not limited to those shown in FIGS. 13, 15, and 16. The brush may have a rasp shape. The universal-joint (U-joint) nozzle brush assembly 200 may use a brush shown in FIG. 17.

The above-mentioned systems may include a motor regulator system for regulating a motor for threading and unthreatening a contact tip. The motor regulator system may be configured to adjust a torque output of a motor with a higher repeatability, thereby regulating the treading action of a contact tip.

While one or more embodiments have been provided in the present disclosure, it may be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. A number of variations and modifications can be made without departing from the scope of the invention as defined in the claims.

What is claimed is:

1. A tip feeder assembly, comprising:
    a tip feeder hopper configured to store contact tips for a welding torch horizontally and to release the contact tips, comprising:
        a body section dimensioned to hold contact tips in horizontal orientations so that one contact tip is on top of another contact tip horizontally, the body section comprising a slot, and a bottom opening section for releasing the contact tips in the horizontal orientations, and
        a slide removably insertable from the slot to close the bottom opening section,
        wherein a groove is formed in the body section so that the slide is engaged with the groove to hold the slide, and
        wherein the tip feeder hopper comprises a top member, a front member, a rear member, first and second side members, and a bottom member, which form the body section, wherein the first side member has the slot, and the front member has the groove coupled to the slot.

2. The tip feeder assembly according to claim 1, wherein the bottom opening section is formed between the first side member and the bottom member, and wherein a contact tip in the body section is released below from the bottom opening when the slide is pulled out from the tip feeder assembly.

3. The tip feeder assembly according to claim 1, wherein a width of the top member, a width of the first and second side members, and a width of the bottom member are determined based on a length of the contact tip.

4. The tip feeder assembly according to claim 1, wherein the bottom member and the groove are arranged at an angle, to move the contact tips toward the center axis of the tip feeder hopper when the slide is inserted into the tip feeder hopper.

5. The tip feeder assembly according to claim 1, further comprising:
    a rotatable feed wheel having tip slots, each tip slot being configured to receive and release a contact tip in its horizontal orientation, the feed wheel being positioned below the center axis of the tip feeder hopper,
    a stepper motor for controlling rotation of the feed wheel, and
    a sensor for detecting an empty tip slot among the tip slots in the feed wheel.

6. The tip feeder assembly according to claim 5, wherein the tip slots are formed at 90 degree angles around a circumference of the feed wheel.

7. The tip feeder assembly according to claim 5, further comprising:
    a tip transition assembly configured to reorient the contact tip from the horizontal orientation to a vertical orientation.

8. The tip feeder assembly according to claim 7, wherein the tip transition assembly comprises:
    a cylindrical section configured to rotatably accommodate the feed wheel so that a top section of the feed wheel is exposed toward the tip feeder hopper, and
    a chute coupled to the cylindrical section and configured to deliver the contact tip down while reorienting the contact tip.

9. The tip feeder assembly according to claim 8, wherein the chute is a guide channel gradually decreasing an inner space of the channel toward an exit of the tip transition assembly.

10. The tip feeder assembly according to claim 8, wherein the tip transition assembly is formed by substantially symmetrical first and second tip transition blocks.

11. The tip feeder assembly according to claim 10, wherein the first and second tip transition blocks force the contact tip to stay in the tip slot until the contact tip moves to the bottom of the feed wheel while the feed wheel is rotating.

12. The tip feeder assembly according to claim 8, wherein the tip feeder hopper is detachably mounted on the top of the tip transition assembly.

13. The tip feeder assembly according to claim 8, further comprising:
    a tip holder assembly assembled below the tip transition assembly configured to receive the contact tip from the tip transition assembly in the vertical orientation.

14. The tip feeder assembly according to claim 13, wherein the tip holder assembly communicates with a tip changer module for mounting the contact tip to the welding torch.

15. The tip feeder assembly according to claim 5, wherein the stepper motor is configured such that:
    the feed wheel is directly mounted to an output shaft of the stepper motor, and/or
    the stepper motor generates a clockwise movement and a counterclockwise movement of the feed wheel.

16. A method for using the tip feeder assembly according to claim 1, the tip feeder assembly further comprising a feed wheel having tip slots, each tip slot being configured to receive and release a contact tip in the horizontal orientation, and a tip transition assembly having a chute configured to reorient the contact tip from the horizontal orientation to a vertical orientation, the method comprising:

rotating the feed wheel in one of clockwise and counter-clockwise directions so that a tip slot receives a contact tip and releases the contact tip toward the chute of the tip transition assembly; and monitoring a vacant tip slot among the tip slots, by using a sensor.

17. The method according to claim 16, comprising:

rotating the feed wheel in another direction to vibrate the contact tips in the tip feeder hopper, thereby preventing the contact tips from becoming lodged in position in the tip feeder hopper.

18. A tip feeder assembly, comprising:

a tip feeder hopper configured to store contact tips for a welding torch horizontally and to release the contact tips, comprising:
  a body section dimensioned to hold contact tips in horizontal orientations so that one contact tip is on top of another contact tip horizontally, the body section comprising a slot, and a bottom opening section for releasing the contact tips in the horizontal orientations,
  a slide removably insertable from the slot to close the bottom opening section,
  a rotatable feed wheel having tip slots, each tip slot being configured to receive and release a contact tip in its horizontal orientation, the feed wheel being positioned below the center axis of the tip feeder hopper,
  a stepper motor for controlling rotation of the feed wheel, and
  a sensor for detecting an empty tip slot among the tip slots in the feed wheel.

* * * * *

UNITED STATES PATENT AND TRADEMARK OFFICE
CERTIFICATE OF CORRECTION

| | | |
|---|---|---|
| PATENT NO. | : 12,162,104 B2 | Page 1 of 1 |
| APPLICATION NO. | : 17/291410 | |
| DATED | : December 10, 2024 | |
| INVENTOR(S) | : Naseem Kteily et al. | |

It is certified that error appears in the above-identified patent and that said Letters Patent is hereby corrected as shown below:

On the Title Page

Insert item (30), as follows:
--(30) Foreign Application Priority Data
November 5, 2018      (CA)     3,023,116--.

In the Claims

Column 8, Line 36, In Claim 10, please delete the term "substantially".

Signed and Sealed this
Fourth Day of February, 2025

Coke Morgan Stewart
*Acting Director of the United States Patent and Trademark Office*